US012646791B2

(12) United States Patent
Nagasawa et al.

(10) Patent No.: US 12,646,791 B2
(45) Date of Patent: Jun. 2, 2026

(54) PRESSURE-REGULATING VALVE FOR POWER STORAGE MODULE

(71) Applicant: NOK CORPORATION, Tokyo (JP)

(72) Inventors: Motohiro Nagasawa, Kitaibaraki (JP); Koji Watanabe, Kitaibaraki (JP); Katsuyoshi Sakuma, Kitaibaraki (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/691,342

(22) PCT Filed: Aug. 5, 2022

(86) PCT No.: PCT/JP2022/030050
§ 371 (c)(1),
(2) Date: Mar. 12, 2024

(87) PCT Pub. No.: WO2023/042570
PCT Pub. Date: Mar. 23, 2023

(65) Prior Publication Data
US 2024/0405350 A1 Dec. 5, 2024

(30) Foreign Application Priority Data
Sep. 16, 2021 (JP) ................................. 2021-151484

(51) Int. Cl.
*H01M 50/325* (2021.01)
*F16K 17/02* (2006.01)
*H01M 50/308* (2021.01)

(52) U.S. Cl.
CPC ........... *H01M 50/325* (2021.01); *F16K 17/02* (2013.01); *H01M 50/308* (2021.01); *H01M 2200/20* (2013.01)

(58) Field of Classification Search
CPC ........... H01M 2200/20; H01M 50/325; H01M 50/308; F16K 17/02; F16K 17/12; (Continued)

(56) References Cited

U.S. PATENT DOCUMENTS

| | | | | |
|---|---|---|---|---|
| 974,245 | A | * | 11/1910 | Donnelly .................. F24D 1/00 237/67 |
| 1,497,726 | A | * | 6/1924 | Keenan ..................... F16K 1/36 251/355 |

(Continued)

FOREIGN PATENT DOCUMENTS

| | | |
|---|---|---|
| CN | 103928646 A | 7/2014 |
| CN | 211957783 U | 11/2020 |

(Continued)

OTHER PUBLICATIONS

Machine Translation of CN212161870 retrieved from espacenet.com (Year: 2025).*

(Continued)

*Primary Examiner* — Jessica Cahill
(74) *Attorney, Agent, or Firm* — Harness, Dickey & Pierce, P.L.C.

(57) ABSTRACT

A pressure-regulating valve for a power storage module includes a case having a recessed part, and a through-hole formed in a bottom portion of the recessed part, a valve body positioned in the recessed part and capable of opening and closing the through-hole by elasticity, and a plug body that closes the recessed part, and the case and the plug body are attachably and detachably fixed.

2 Claims, 10 Drawing Sheets

(58) Field of Classification Search
CPC ......... Y10T 137/7908; Y10T 137/7909; Y10T 137/7921

See application file for complete search history.

(56) References Cited

U.S. PATENT DOCUMENTS

| | | | | |
|---|---|---|---|---|
| 1,657,741 | A * | 1/1928 | Carrey | F16K 15/02 |
| | | | | 137/533 |
| 5,258,243 | A * | 11/1993 | Cannone | H01M 50/383 |
| | | | | 429/54 |
| 7,951,474 | B2 | 5/2011 | Schembri et al. | |
| 10,978,685 | B2 * | 4/2021 | Koch | H01M 50/325 |
| 2012/0176730 | A1 * | 7/2012 | Takemura | H01G 11/20 |
| | | | | 361/518 |
| 2017/0284522 | A1 * | 10/2017 | Kurose | F16H 25/20 |
| 2020/0243913 | A1 | 7/2020 | Hamaoka et al. | |
| 2020/0340592 | A1 | 10/2020 | Nakayama et al. | |
| 2021/0159475 | A1 | 5/2021 | Hamaoka et al. | |

FOREIGN PATENT DOCUMENTS

| | | | | |
|---|---|---|---|---|
| CN | 212161870 | U | 12/2020 | |
| DE | 102020131052 | A1 | 5/2021 | |
| GB | 2085217 | A | 4/1982 | |
| GB | 2158634 | A * | 11/1985 | H01M 50/383 |
| JP | S48-032261 | Y1 | 10/1973 | |
| JP | S50-024987 | Y1 | 7/1975 | |
| JP | 04206453 | A * | 7/1992 | H01M 2/1229 |
| JP | 09092251 | A * | 4/1997 | H01M 2/1229 |
| JP | 2003045393 | A * | 2/2003 | H01M 2/1229 |
| JP | 2008-192588 | A | 8/2008 | |
| JP | 2012-156489 | A | 8/2012 | |
| JP | 2014-099266 | A | 5/2014 | |
| JP | 2018-133374 | A | 8/2018 | |
| WO | 2019-064843 | A1 | 4/2019 | |

OTHER PUBLICATIONS

International Search Report issued in corresponding International Application No. PCT/JP2022/030050, mailed Oct. 4, 2022, with English translation (5 Pages).

Written Opinion issued in corresponding International Application No. PCT/JP2022/030050, mailed Oct. 4, 2022, with English translation (8 Pages).

International Preliminary Report on Patentability issued in corresponding International Application No. PCT/ JP2022/030050, mailed Oct. 4, 2022, with English translation (9 Pages).

Extended European Search Report for corresponding European Patent Application No. 22869718.1 dated Aug. 1, 2025 (11 Pages).

Request for the Submission of an Opinion for corresponding Korean Patent Application No. 10-2024-7008499 dated Oct. 28, 2025, with English translation (14 Pages).

* cited by examiner

PRESSURE-REGULATING VALVE FOR POWER STORAGE MODULE

CROSS REFERENCE TO RELATED APPLICATIONS

The present application is a national stage application of International Patent Application No. PCT/JP2022/030050 filed on Aug. 5, 2022, which claims the benefit of Japanese Patent Application No. 2021-151484, filed on Sep. 16, 2021. The contents of these applications are incorporated herein by reference in their entirety.

BACKGROUND

Technical Field

The present disclosure relates to a pressure-regulating valve for a power storage module.

Related Art

Conventionally, as a power storage module for a battery to be mounted on a vehicle, there has been proposed a power storage module provided with a pressure-regulating valve (for example, see International Publication No. WO 2019/064843). In the power storage module described in WO 2019/064843, the pressure-regulating valve includes a case member in which a cylindrical portion is formed, a valve body that is an elastic member to be accommodated in the cylindrical portion, and a cover member that closes an opening of the case member. Further, the cover member presses the valve body to press the valve body against the opening end. Thereby, when the pressure in the internal space reaches a set value or more, closing of the opening end by the valve body is released.

In the power storage module described in WO 2019/064843, the cover member is joined to the case member by welding or the like. Therefore, it is not possible to remove the cover member from the case member, and it is not possible to cope with, for example, the case in which the valve body is deteriorated and elasticity is reduced, the case in which desired valve opening characteristics cannot be obtained due to an initial failure, the case in which a battery electrolyte becomes insufficient, and the like, and there is an disadvantage of maintainability being low.

The present disclosure is made in view of the aforementioned problem, and it is an object of the present disclosure to provide a pressure-regulating valve for a power storage module capable of improving maintenance.

SUMMARY

In order to attain the above-described object, a pressure-regulating valve for a power storage module according to the present disclosure includes a case having a recessed part, and a through-hole formed in a bottom portion of the recessed part, a valve body positioned in the recessed part and capable of opening and closing the through-hole by elasticity, and a plug body that closes the recessed part, wherein the case and the plug body are attachably and detachably fixed.

In the pressure-regulating valve for a power storage module according to one aspect of the present disclosure, the case and the plug body are attachable and detachable as a result of threaded portions being formed in the case and the plug body respectively.

In the pressure-regulating valve for a power storage module according to one aspect of the present disclosure, the plug body and the case are attachable and detachable as a result of a fitting protruding part being provided at one of the plug body and the case, and a fitting recessed part to be fitted on the fitting protruding part being provided at another one.

In the pressure-regulating valve for a power storage module according to one aspect of the present disclosure, the case has a case body in which the recessed part is formed, and a lid portion provided on an opposite side to the bottom portion with respect to the recessed part, the plug body is provided rotatably with respect to the case with an insertion direction to the recessed part in an axial direction, and has a protruding part toward an outer periphery side, the lid portion has a passing hole through which the plug body at a predetermined rotation angle can pass, and the plug body is restricted from falling off as a result of rotating after passing through the passing hole, and thereby the protruding part becomes incapable of passing through the passing hole.

In the pressure-regulating valve for a power storage module according to one aspect of the present disclosure, the case has a plurality of the recessed parts, and the valve body and the plug body are provided for each of the plurality of recessed parts.

Effects of Disclosure

According to the pressure-regulating valve for a power storage module according to the present disclosure, it is possible to improve maintainability.

DETAILED DESCRIPTION

Hereinafter, embodiments of the present disclosure will be described with reference to the drawings.

First Embodiment

Figure 1:
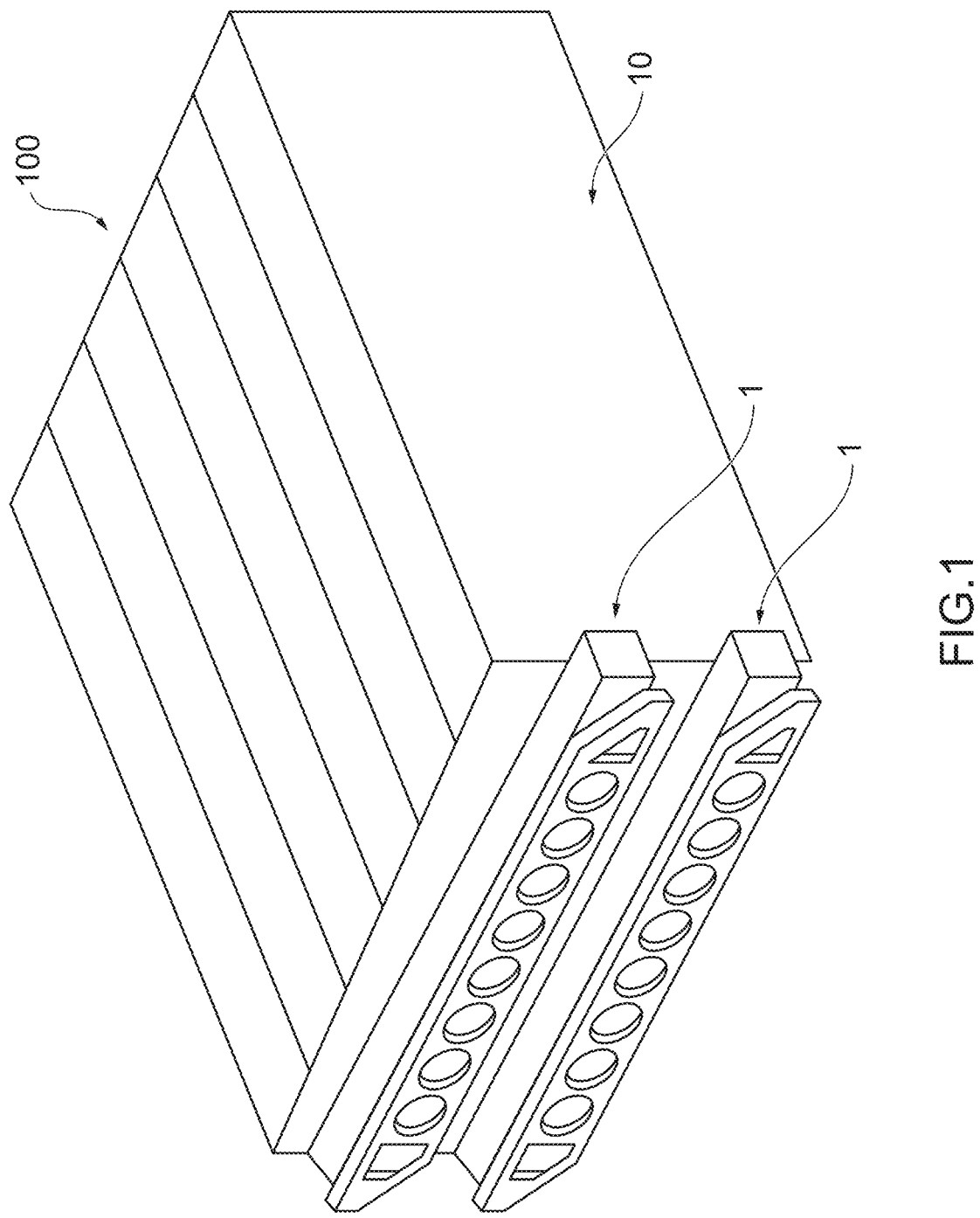
FIG. 1 is a perspective view of a power storage unit including a pressure-regulating valve for a power storage module according to a first embodiment of the present disclosure.
Figure 2:
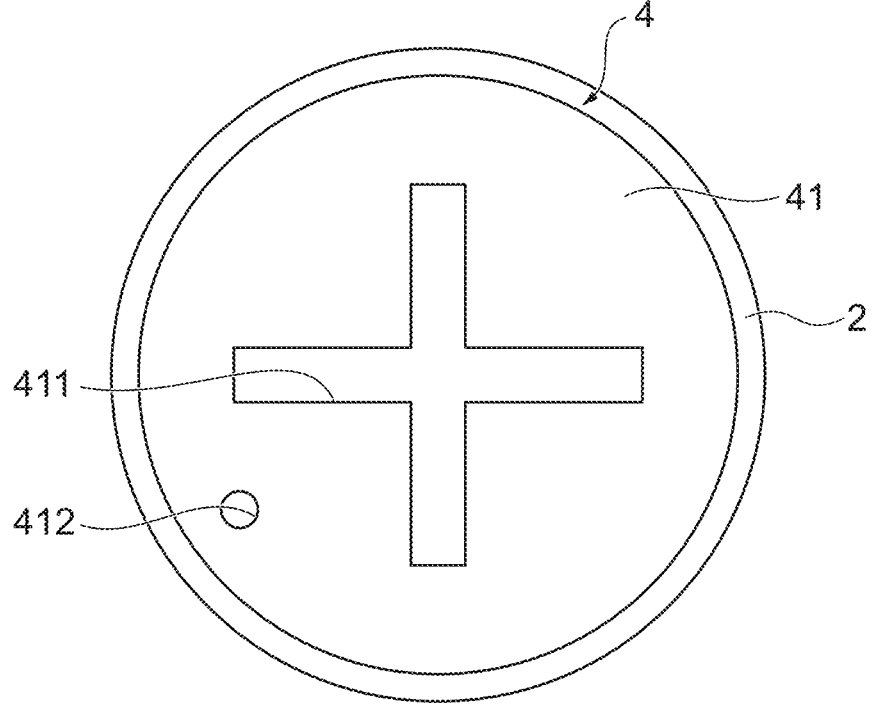
FIG. 2 is a plan view of the pressure-regulating valve for a power storage module according to the first embodiment of the present disclosure.
Figure 3:
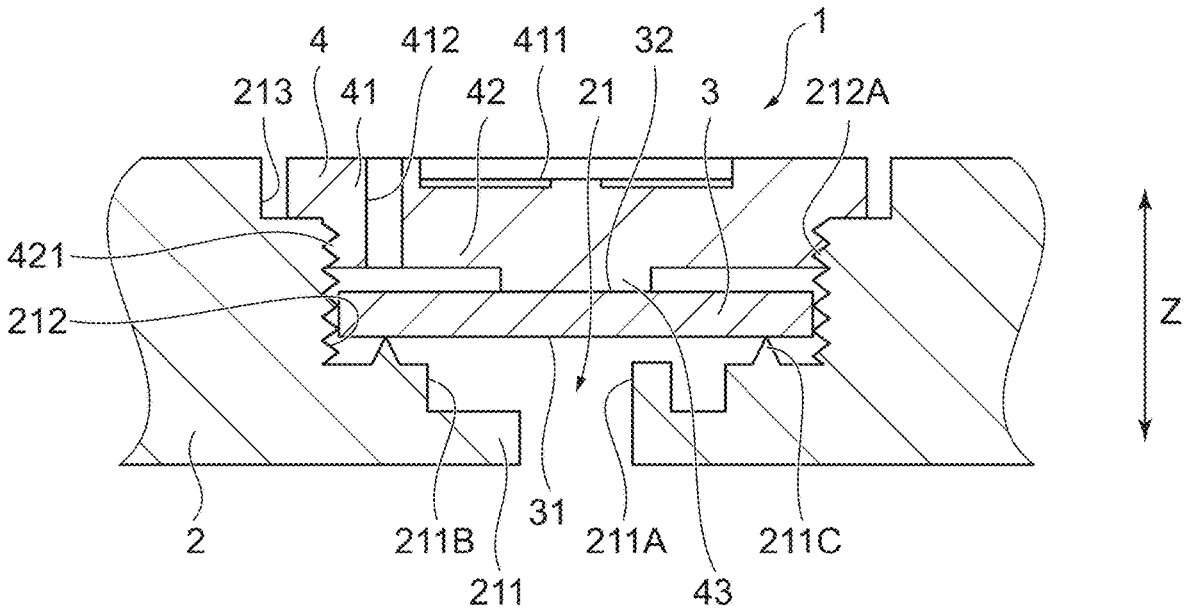
FIG. 3 is a sectional view schematically showing the pressure-regulating valve for a power storage module according to the first embodiment of the present disclosure.
Figure 4:
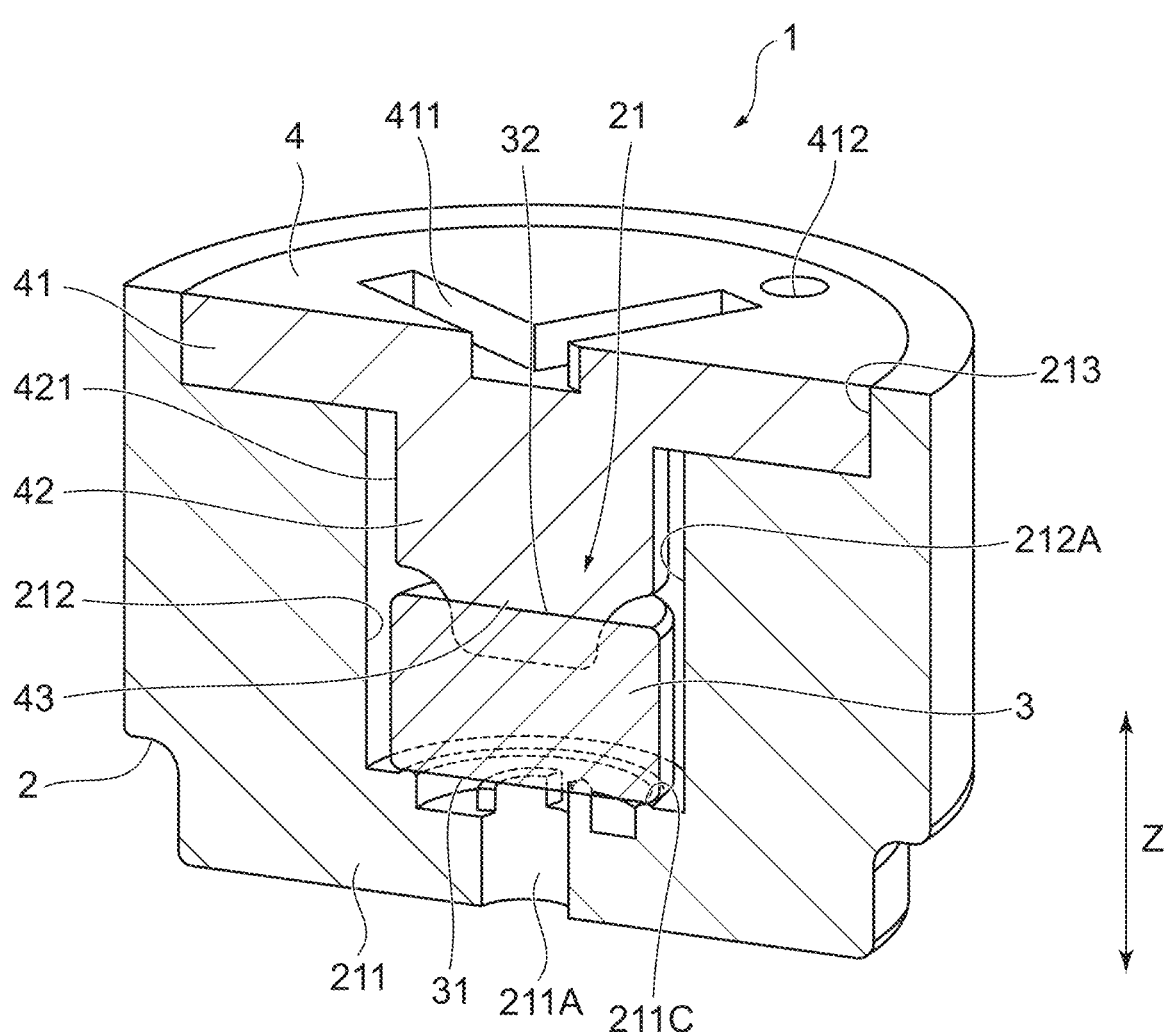
FIG. 4 is a sectional view of the pressure-regulating valve for a power storage module according to the first embodiment of the present disclosure.
Figure 5:
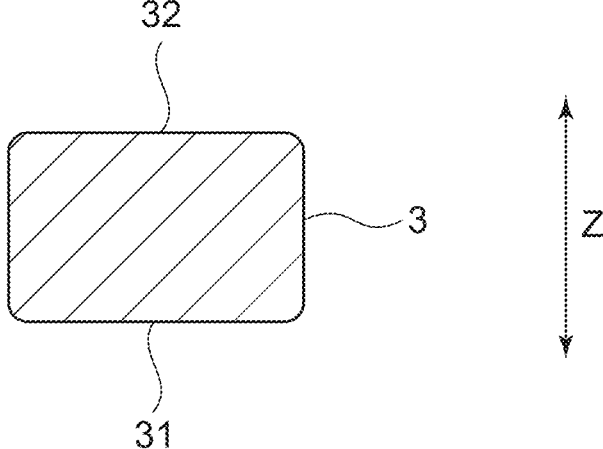
FIG. 5 is a sectional view of a valve body of the pressure-regulating valve for a power storage module according to the first embodiment of the present disclosure.
Figure 6:
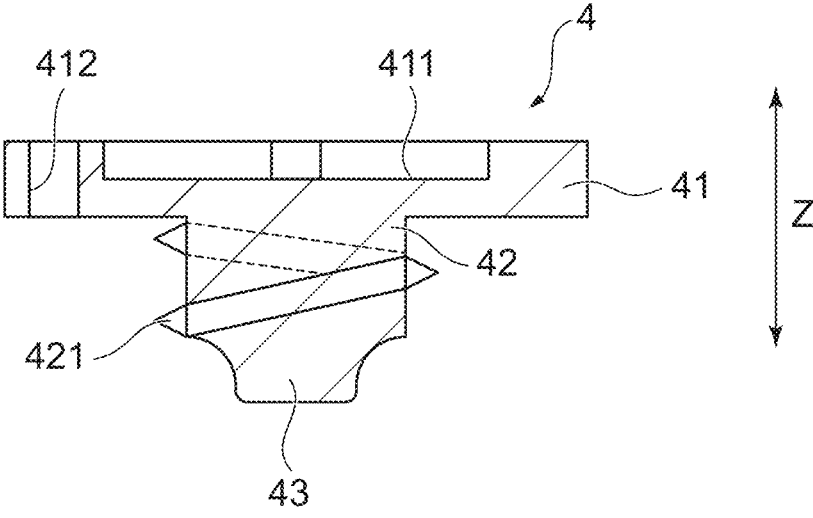
FIG. 6 is a sectional view of a plug body of the pressure-regulating valve for a power storage module according to the first embodiment of the present disclosure.
Figure 7:
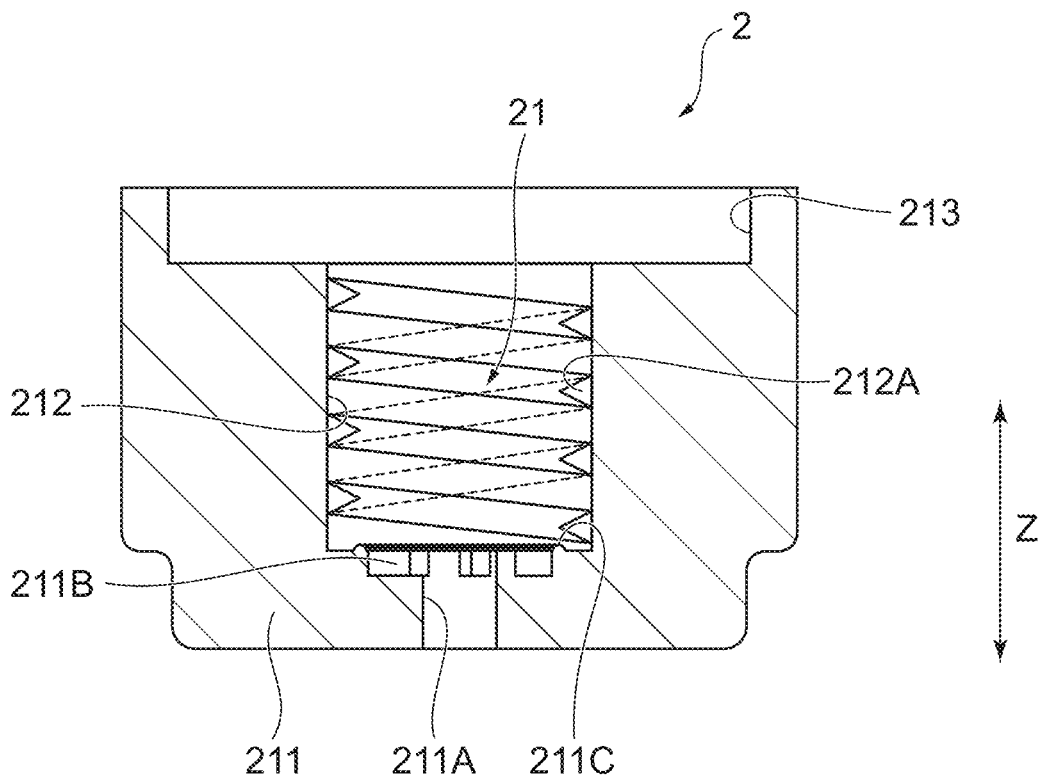
FIG. 7 is a sectional view of a case of the pressure-regulating valve for a power storage module according to the first embodiment of the present disclosure.

FIG. 1 is a perspective view of a power storage unit 100 including a pressure-regulating valve 1 for a power storage module according to a first embodiment of the present disclosure, FIG. 2 is a plan view of the pressure-regulating valve 1 for a power storage module, FIG. 3 is a sectional view schematically showing the pressure-regulating valve 1 for a power storage module, FIG. 4 is a sectional view of the pressure-regulating valve 1 for a power storage module, FIG. 5 is a sectional view of a valve body 3 of the pressure-regulating valve 1 for a power storage module, FIG. 6 is a sectional view of a plug body 4 of the pressure-regulating valve 1 for a power storage module, and FIG. 7 is a sectional view of a case 2 of the pressure-regulating valve 1 for a power storage module.

As shown in FIGS. 1 to 7, the pressure-regulating valve 1 for a power storage module according to the first embodiment of the present disclosure includes a case 2 having a recessed part 21, and a through-hole 211A formed in a bottom portion 211 of the recessed part 21, a valve body 3 positioned in the recessed part 21 and capable of opening and closing the through-hole 211A by elasticity, and a plug body 4 that closes the recessed part 21, and the case 2 and the plug body 4 are attachably and detachably fixed. Hereinafter, the pressure-regulating valve 1 for a power storage module will be specifically described. Note that since FIGS. 2 and 3 are schematic views, there exist some differences from FIGS. 4 to 7 on the drawings, but FIGS. 2 to 7 show the same embodiment.

As shown in FIG. 1, the power storage unit 100 is configured by the pressure-regulating valve 1 for a power storage module and a power storage device (power storage module) 10. The pressure-regulating valve 1 for a power storage module is configured to release pressure when internal pressure rises in the power storage device 10. The power storage device 10 is, for example, a nickel hydrogen battery, and is provided to supply electric power to a motor in a vehicle such as an electric car, and a hybrid car.

The case 2 is formed of a synthetic resin, for example, and a plurality of recessed parts 21 are formed. Although FIGS. 3, 4 and 7 illustrate only one of the recessed parts 21, it is assumed that the other recessed parts are similar. The recessed part 21 is formed in a recessed shape that is opened upward in FIG. 3 by having the bottom portion 211, a valve body placement portion 212, and a large diameter portion 213. Hereinafter, for convenience of explanation, a depth direction (up-down direction in FIG. 3) of the recessed part 21 is defined as a Z direction, a side where the recessed part 21 is opened in the Z direction is defined as an opening side, and a side (lower side in FIG. 3) where the bottom portion 211 of the recessed part 21 is provided in the Z direction is defined as an introduction side.

The bottom portion 211 extends along a plane orthogonal to the Z direction, and has the through-hole 211A formed in a center portion, a groove portion 211B communicating with the through-hole 211A, and a bead 211C protruding from a surface on an opening side. An opening portion that discharges gas of the power storage device 10 is positioned on the introduction side of the bottom portion 211, and the gas is introduced toward an inside of the recessed part 21 from the introduction side through the through-hole 211A.

The groove portion 211B is formed to partially enlarge a diameter of the through-hole 211A. Thereby, an area at a time of pressure of the gas introduced into the recessed part 21 from the through-hole 211A acting on the valve body 3 increases. The groove portion 211B can be formed in response to a set pressure that opens the valve body 3, and the groove portion may be omitted.

The bead 211C is formed into an annular shape around an axis along the Z direction and is formed into a triangular shape (blade shape) in section having a vertex on the opening side. The bead 211C functions as a valve seat when the valve body 3 contacts the bead 211C. When the bead 211C is formed into a blade shape, the bead 211C can bite into the valve body 3 which is an elastic member, thereby improving surface pressure and ensuring sealing performance. Note that the bead 211C is not limited to the one having a triangular shape in section but may have other shapes.

The valve body placement portion 212 is formed closer to the opening side than the bottom portion 211, and is formed to be able to accommodate the valve body 3. A threaded portion 212A is formed on an inner peripheral surface of the cylindrical valve body placement portion 212. The threaded portion 212A is a female screw portion. Note that the threaded portion 212A can be formed on at least a portion in which the plug body 4 is provided, the threaded portion 212A may be formed on the entire valve body placement portion 212, or the threaded portion 212A may not be formed in the portion where the valve body 3 is provided.

The large diameter portion 213 is positioned closer to the opening side (opposite side to the bottom portion 211 with the valve body placement portion 212 therebetween) than the valve body placement portion 212 with an inner peripheral surface formed in a cylindrical shape, and is formed to have a diameter larger than the valve body placement portion 212.

The valve body 3 is entirely formed of an elastic member and is formed into a circular columnar shape (or a disk shape) with a height direction in the Z direction. An outside diameter of the valve body 3 is slightly smaller than the inside diameter of the valve body placement portion 212, so that the valve body 3 can be positioned in the valve body placement portion 212 and the valve body 3 does not incline. A bottom surface (surface on the introduction side) 31 of the valve body 3 is a seat surface, and is capable of contacting the bead 211C.

The plug body 4 is formed of a synthetic resin, for example, and integrally has a disk-shaped flange portion 41, a protrusion portion 42 protruding to the introduction side from the flange portion 41, and a pressing portion 43 provided at a tip end of the protrusion portion 42.

An outside diameter of the flange portion 41 is larger than the inside diameter of the valve body placement portion 212 and slightly smaller than an inside diameter of the large diameter portion 213, and the flange portion 41 is positioned in the large diameter portion 213. A+-shaped groove portion 411 is formed on a top surface (surface on the opening side) of the flange portion 41, and is operable by a Phillips-head screwdriver. Note that a tool for operating the flange portion 41 is not limited to a Phillips-head screwdriver, but a groove or the like in a shape corresponding to the tool can be formed on the top surface.

A vent hole 412 penetrating in the Z direction is formed in the flange portion 41, and a space in the recessed part 21 and an external space on the opening side are caused to communicate with each other. Thereby, when the internal pressure of the power storage device 10 rises and gas is introduced into the recessed part 21, the gas can be released to the external space.

The protrusion portion 42 is formed into a circular columnar shape, and a threaded portion 421 is formed on an outer peripheral surface thereof. The threaded portion 421 is a male screw portion. The threaded portion 421 can be screwed into the threaded portion 212A formed on the recessed part 21. That is to say, the plug body 4 moves to the introduction side by operating the flange portion 41 by a tool and rotating the plug body 4 in one direction around the axis along the Z direction, and moves to the opening side by rotating the plug body in another direction. In this way, the plug body 4 is fixed to the case 2 by screwing. Note that the positions where the threaded portions are formed are not limited to the recessed part 21 and the protrusion portion 42, but the threaded portions can be formed at positions corresponding to each other on a case side and a plug body side.

The pressing portion 43 has a tapering shape in which an outside diameter becomes smaller as progress toward a tip end side (introduction side), and a tip end surface thereof abuts on a top surface (surface on the opening side) 32 of the valve body 3. When the plug body 4 is rotated in the one direction in a state in which the valve body 3 is accommodated in the recessed part 21, the pressing portion 43 approaches the valve body 3 and abuts on the valve body 3. When rotation is further continued in this state, the valve body 3 is pressed, pressed against the bead 211C of the case 2 and compressed. As a result of an undersurface of the flange portion 41 abutting on a top surface of the large diameter portion 213, movement of the plug body 4 to the introduction side is restricted, and a pressing amount is controlled.

When the pressure-regulating valve 1 for a power storage module as described above is provided in the power storage device 10, and internal pressure of the power storage device 10 changes, the pressure-regulating valve 1 for a power storage module functions as follows. First, when the internal pressure of the power storage device 10 is smaller than a preset reference value, a force to the valve opening side as a result of the internal pressure acting on the valve body 3 is smaller than a force for opening the valve body 3. Accordingly, the valve body 3 keeps a closed state. On the other hand, when the internal pressure of the power storage device 10 reaches the reference value or more, the force to the valve opening side becomes equal to or larger than the force for opening the valve body 3, the valve body 3 deforms and the bottom surface 31 separates from the bead 211C. In other words, the valve body 3 opens, gas passes through the through-hole 211A to flow into the recessed part 21 from the power storage device 10. The gas passes through the vent hole 412 of the flange portion 41 and is released to the outside from the inside of the recessed part 21.

The pressure-regulating valve 1 for a power storage module may have an initial failure such as being unable to obtain desired valve opening characteristics due to malfunction in respective components or poor assembly. At this time, it is possible to replace components, or correct an assembled state by removing the plug body 4 screwed into the case 2. As described above, a plurality of recessed parts are formed in the case 2, and the valve body 3 and the plug body 4 identical or nearly identical to the above description are provided in each of these recessed parts. Accordingly, if an initial failure occurs in some of the valves, the plug bodies 4 can be removed from only those valves as targets.

By using the power storage device 10 provided with the pressure-regulating valve 1 for a power storage module, various deteriorations and the like may occur in respective parts. For example, the valve body 3 which is an elastic member deteriorates and elasticity may be reduced, or a battery electrolyte may become insufficient. At this time, it is possible to replace the valve body 3, or refill the battery electrolyte by removing the plug body 4.

In this way, according to the pressure-regulating valve 1 for a power storage module according to the embodiment of the present disclosure, since the plug body 4 and the case 2 are attachably and detachably fixed, it is possible to remove the plug body 4 from the case 2 in response to an initial failure, deterioration or the like, and it is possible to improve maintainability.

Further, since the case 2 has a plurality of recessed parts 21, and the plug body 4 is provided for each of the plurality of recessed parts 21, it is possible to remove only some of the plug bodies 4, and it is possible to improve maintainability as compared with the configuration in which a common cover is provided for a plurality of recessed parts. In particular, in the configuration in which the common cover is provided for a plurality of recessed parts, it is necessary to replace a whole of the configuration when malfunctions occur to some valves, whereas in the configuration in which the plug body 4 is provided for each of the plurality of recessed parts 21, it is possible to cope with the malfunctions by replacement or the like of components in only the valves where malfunctions occur.

Second Embodiment

Figure 8:
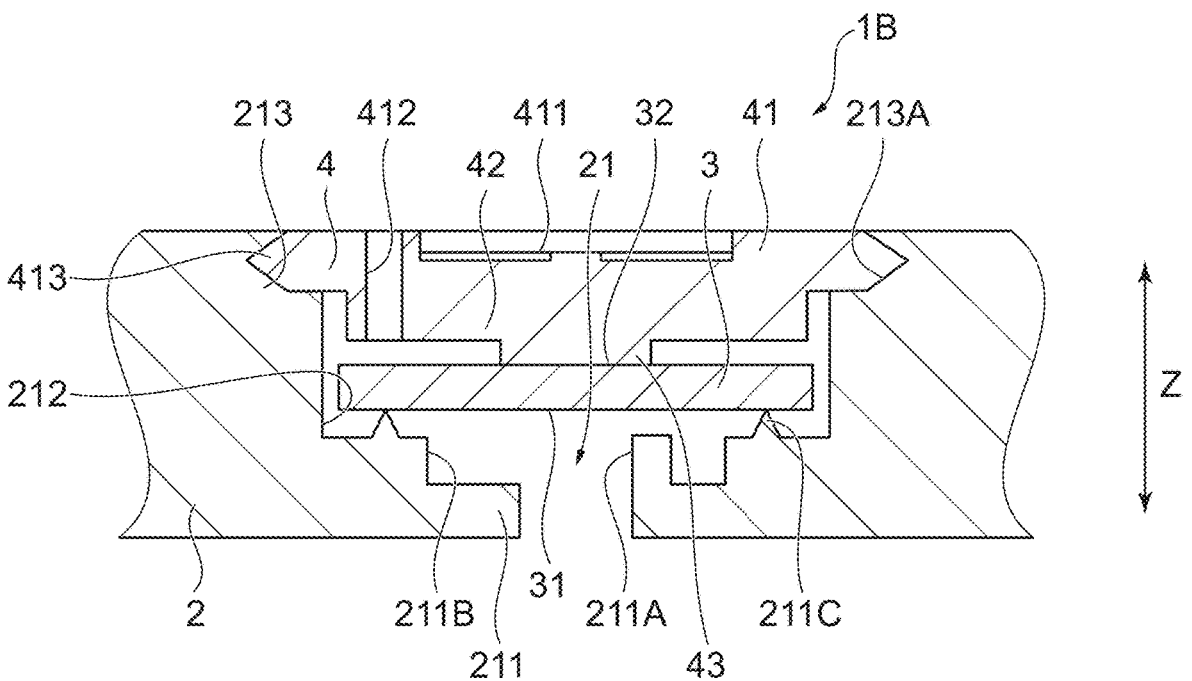
FIG. 8 is a sectional view schematically showing a pressure-regulating valve for a power storage module according to a second embodiment of the present disclosure.

A pressure-regulating valve 1B for a power storage module according to a second embodiment of the present disclosure differs from the pressure-regulating valve 1 for a power storage module of the first embodiment in a point that a fitting recessed part 213A and a fitting protruding part 413 are provided instead of the threaded portions 212A and 421, and positions where these portions are provided, as shown in FIG. 8, and common components are assigned with same reference signs and explanation thereof is omitted.

The fitting recessed part 213A is formed in a large diameter portion 213 of a case 2, and the fitting protruding part 413 is formed at a flange portion 41 positioned in the large diameter portion 213, of a plug body 4. For example, the fitting protruding part 413 and the fitting recessed part 213A fit together (are fitted together) by pressing the plug body 4 in the Z direction, and thereby the case 2 and the plug body 4 are fixed. Further, by inclining the plug body 4 with respect to the case 2 by using a tool, for example, fitting can be released.

In the pressure-regulating valve 1B for a power storage module of the second embodiment like this, it is also possible to improve maintainability as in the first embodiment. Note that a configuration in which the fitting recessed part is provided on the plug body side, and the fitting protruding part is provided on the case side may be adopted. Further, the positions for forming the fitting recessed part and the fitting protruding part are not limited to this.

Third Embodiment

Figure 9:
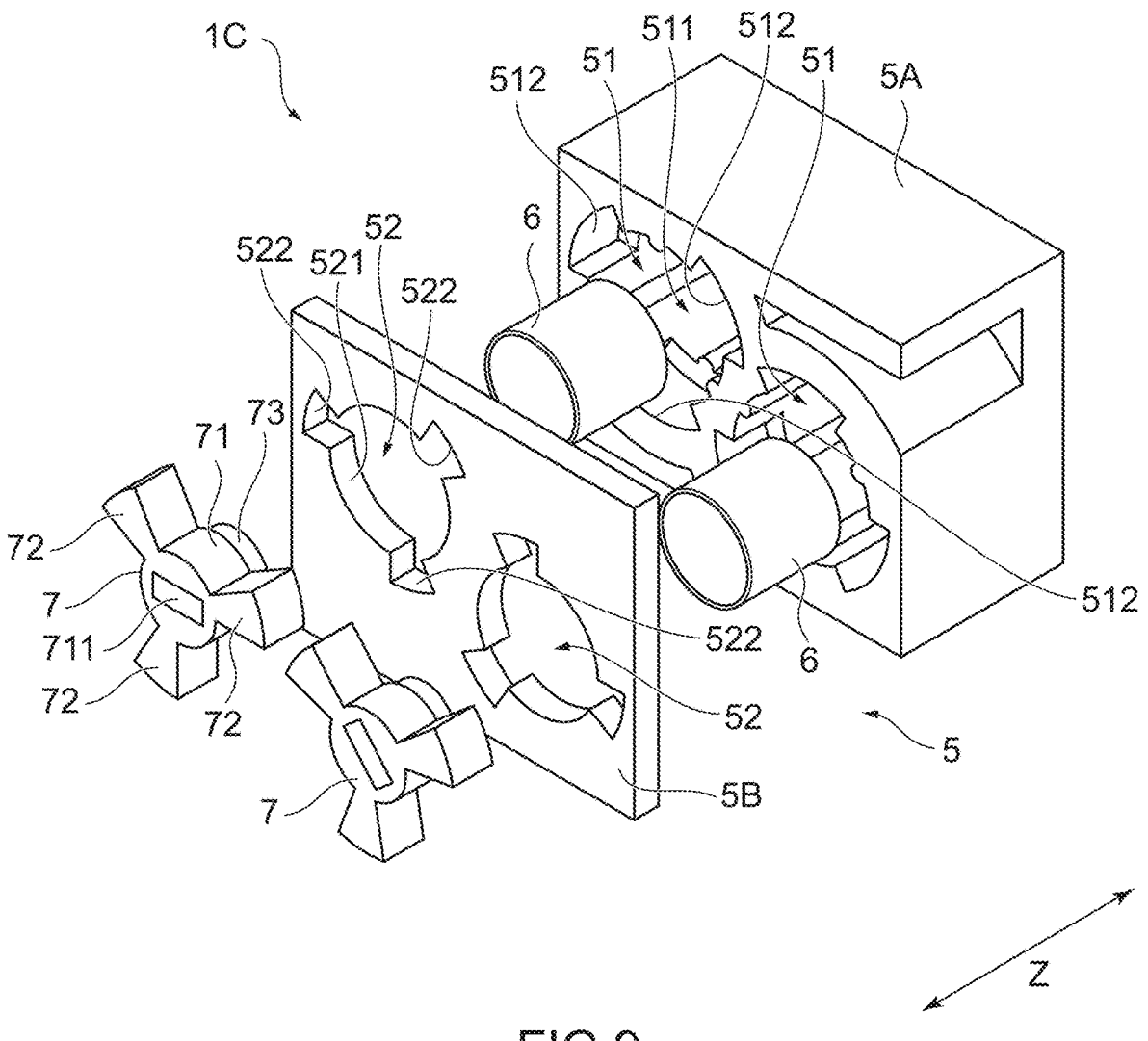
FIG. 9 is an exploded perspective view of a pressure-regulating valve for a power storage module according to a third embodiment of the present disclosure.
Figure 10:
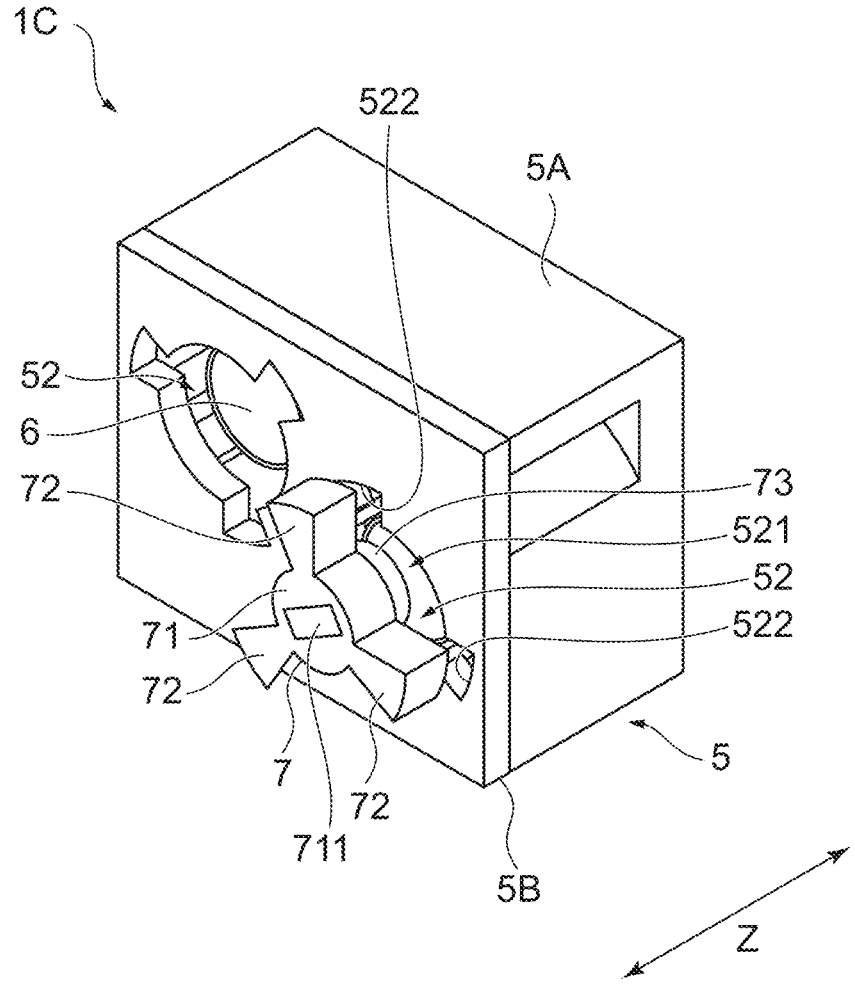
FIG. 10 is an exploded perspective view of the pressure-regulating valve for a power storage module according to the third embodiment of the present disclosure.
Figure 11:
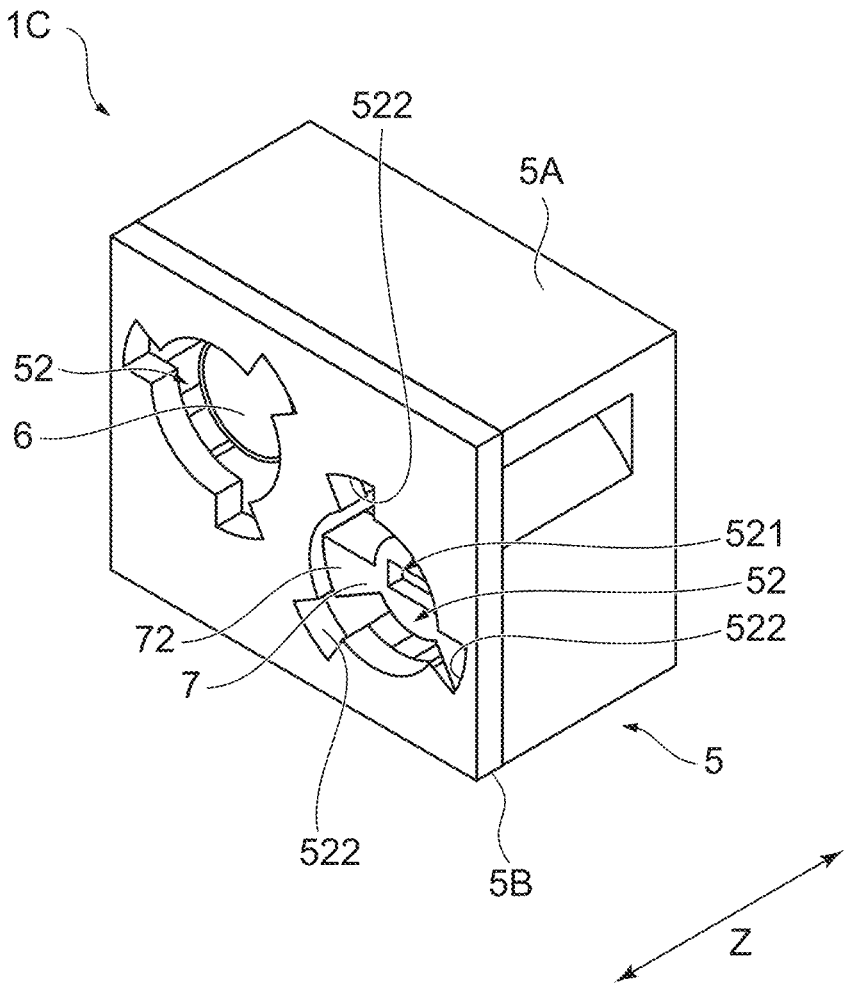
FIG. 11 is a perspective view of the pressure-regulating valve for a power storage module according to the third embodiment of the present disclosure.

FIGS. 9 to 11 are perspective views of a pressure-regulating valve 1C for a power storage module according to a third embodiment of the present disclosure. The pressure-regulating valve 1C for a power storage module according to the third embodiment of the present disclosure includes a case 5 having a recessed part 51 and a through-hole formed in a bottom portion of the recessed part 51, a valve body 6 positioned in the recessed part 51 and capable of opening and closing the through-hole by elasticity, and a plug body 7 that has a pressing portion 73 pressing the valve body 6 to a valve closing side, and closes the recessed part 51, and the case 5 and the plug body 7 are attachably and detachably fixed.

The case 5 has a case body 5A in which the recessed part 51 is formed, and a lid portion 5B provided on an opposite side to the bottom portion with respect to the recessed part 51. In other words, the lid portion 5B is provided to close the recessed part 51. An entire surface of the case body 5A and the lid portion 5B can be fixed together, for example, by welding.

A passing hole 52 through which the plug body 7 is passable is formed in the lid portion 5B. The passing hole 52 has a circular portion 521, and three notch portions 522 formed in predetermined positions in a circumferential direction so that a diameter of the circular portion 521 is enlarged. The three notch portions 522 are equidistantly disposed in the circumferential direction, for example.

The recessed part 51 has a circular portion 511 which overlaps the circular portion 521 of the passing hole 52 and in which the valve body 6 is positioned, and three notch portions 512 that are formed in predetermined positions in a circumferential direction so that a diameter of the circular portion 511 is enlarged. A dimension in the circumferential direction of the notch portion 512 of the recessed part 51 is formed to be large with respect to the notch portion 522 of the passing hole 52. Thereby, the notch portion 522 of the passing hole 52 is positioned to overlap a part of the notch portion 512 of the recessed part 51.

The valve body 6 is identical or nearly identical to the valve body 3 of the first embodiment.

The plug body 7 has a circular columnar base portion 71, three protruding parts 72 formed to protrude to an outer periphery side from an outer peripheral surface of the base portion 71, and the pressing portion 73 protruding from the base portion 71 toward an inside of the recessed part 51 (toward a valve body 6 side). The base portion 71 has dimensions capable of passing through the passing hole 52. A groove portion 711 is formed on a surface facing an opposite side to the valve body 6, of the base portion 71, as in the first embodiment, and is operable by a tool, and the plug body 7 is rotatable around an axial direction along the Z direction.

The protruding parts 72 are equidistantly disposed in the circumferential direction identically to the notch portions 522, and each has dimensions capable of passing through the notch portion 522. Furthermore, a circumferential dimension of the protruding part 72 is smaller than a circumferential dimension of the notch portion 512 of the recessed part 51, the protruding part 72 is movable in the circumferential direction in the notch portion 512. In other words, the plug body 7 is rotatable in a state of being accommodated in the recessed part 51. The pressing portion 73 is identical or nearly identical to the pressing portion 43 of the first embodiment.

Only when the rotatable plug body 7 is moved to a predetermined rotation angle, the respective three protruding parts 72 are in the positions corresponding to the three notch portions 522, and the plug body 7 can pass through the passing hole 52. When the plug body 7 passes through the passing hole 52, the protruding part 72 is positioned in the notch portion 512 of the recessed part 51. Subsequently, when the plug body 7 is rotated around the axial direction, the protruding part 72 moves in the notch portion 512, and the protruding part 72 and the notch portion 522 do not overlap in the Z direction. In other words, the protruding part 72 is incapable of passing through the notch portion 522 of the passing hole 52 (abuts on a portion around the passing hole 52, of the lid portion 5B), and movement toward an outside of the recessed part 51 is restricted. Thereby, the plug body 7 is restricted from falling off, and is fixed to the case 5.

On the other hand, when the plug body 7 is rotated in an opposite direction to the above, in the state in which the plug body 7 is fixed to the case 5, the protruding parts 72 move to positions where they overlap the notch portions 522, and the plug body 7 is brought into the state in which it can pass through the passing hole 52 again. In other words, it is possible to remove the plug body 7 from the case 5.

In the pressure-regulating valve 1C for a power storage module of the third embodiment like this, it is also possible to improve maintainability as in the first embodiment.

Note that the present disclosure is not limited to the mode of the above-described embodiments, but includes other configurations and the like that can achieve the object of the present disclosure, and modifications and the like as shown below are also included in the present disclosure. For example, in the first embodiment of the present disclosure described above, although the case 2 has the plurality of recessed parts 21, and the plug body 4 is provided for each of the plurality of recessed parts 21, a configuration in which a case has only one recessed part may be adopted. This also applies to the second and third embodiments.

Although the embodiments of the present disclosure are described thus far, the present disclosure is not limited to the pressure-regulating valves for a power storage module according to the embodiments of the present disclosure described above, but includes all aspects included in the idea and the claims of the present disclosure. Further, in order to exhibit at least a part of the problem and the effects described above, the respective configurations may be selectively combined as appropriate. For example, the shapes, materials, placements, sizes and the like of the respective components in the embodiments can be changed as appropriate according to a specific use aspect of the present disclosure.

The invention claimed is:

1. A pressure-regulating valve for a power storage module, comprising:

a case having a recessed part, and a through-hole formed in a bottom portion of the recessed part;

a valve body positioned in the recessed part and capable of opening and closing the through-hole by elasticity; and a plug body that closes the recessed part, wherein the recessed part has a cylindrical valve body placement portion accommodating the valve body and a female screw portion being formed on its inner peripheral surface, and a large diameter portion positioned closer to an opening side of the recessed part than the valve body placement portion and having a diameter larger than the valve body placement portion, the plug body has a flange portion positioned in the large diameter portion, a circular columnar-shaped protrusion portion protruding from the flange portion and a male screw portion being formed on its outer peripheral surface, and a pressing portion provided at a tip end of the protrusion portion and abutting on the valve body from the opposite side of the valve seat, the case and the plug body are attachably and detachably fixed as a result of the male screw portion being screwed into the female screw portion, the bottom portion has a valve seat which the valve body contacts, as a result of the flange portion abutting on the large diameter portion, movement of the plug body toward the bottom portion is restricted, and due to the pressing portion abutting on the valve body, the valve body is pressed, pressed against the valve seat, and compressed.

2. The pressure-regulating valve for a power storage module according to claim 1, wherein the case has duplicates of the recessed part, and duplicates of the valve body and the plug body are provided for each of the duplicated recessed parts.

\* \* \* \* \*